United States Patent
Shamis et al.

(10) Patent No.: US 9,572,190 B2
(45) Date of Patent: Feb. 14, 2017

(54) DEVICE AND METHOD FOR ASSOCIATING WITH WIFI NETWORKS

(71) Applicant: APPLE INC., Cupertino, CA (US)

(72) Inventors: Artiom Shamis, Los Gatos, CA (US); Kapil Chhabra, Milpitas, CA (US)

(73) Assignee: APPLE INC., Cupertino, CA (US)

( * ) Notice: Subject to any disclaimer, the term of this patent is extended or adjusted under 35 U.S.C. 154(b) by 388 days.

(21) Appl. No.: 13/910,268

(22) Filed: Jun. 5, 2013

(65) Prior Publication Data
US 2014/0365669 A1    Dec. 11, 2014

(51) Int. Cl.
*G06F 15/16* (2006.01)
*H04W 76/02* (2009.01)
*H04W 48/20* (2009.01)
*H04W 84/12* (2009.01)

(52) U.S. Cl.
CPC ........... *H04W 76/027* (2013.01); *H04W 48/20* (2013.01); *H04W 84/12* (2013.01)

(58) Field of Classification Search
CPC ......... H04L 47/14; H04L 41/12; H04W 48/16; H04W 48/18; H04W 48/20; H04W 84/12
USPC ....................................................... 709/227
See application file for complete search history.

(56) References Cited

U.S. PATENT DOCUMENTS

| | | | | |
|---|---|---|---|---|
| 6,002,679 | A * | 12/1999 | Liu et al. | 370/335 |
| 9,105,031 | B2 * | 8/2015 | Shen | G06Q 30/02 |
| 9,167,512 | B2 * | 10/2015 | Ryerson | H04W 48/18 |
| 9,191,699 | B2 * | 11/2015 | Agerbak | H04N 21/43615 |
| 9,247,492 | B2 * | 1/2016 | Millington | H04W 76/02 |
| 2013/0318572 | A1 * | 11/2013 | Singh | H04W 12/08 726/4 |
| 2014/0010222 | A1 * | 1/2014 | Chen et al. | 370/338 |
| 2014/0204903 | A1 * | 7/2014 | Kim et al. | 370/331 |

* cited by examiner

*Primary Examiner* — Kristie Shingles
(74) *Attorney, Agent, or Firm* — Fay Kaplun & Marcin, LLP

(57) ABSTRACT

A method automatically connects a device to a WiFi network. The method includes determining WiFi networks that are available for a connection thereto. The method includes categorizing each of the WiFi networks as a private WiFi network or a public WiFi network in which the private WiFi network utilizes a first association process while the public WiFi network utilizes a second association process. The method includes executing a first automatic connection process using the first association process until a successful connection is established to one of the private WiFi networks based upon a first prioritized list. The method includes executing a second automatic connection process until a successful connection is established to one of the public WiFi networks based upon a second prioritized list when the first automatic connection process to the private wireless networks is unsuccessful.

20 Claims, 7 Drawing Sheets

DEVICE AND METHOD FOR ASSOCIATING WITH WIFI NETWORKS

BACKGROUND INFORMATION

A service provider may provide a "public" WiFi network for users such that a station connects to the public WiFi network. Further service providers may also provide respective public WiFi networks for the users. A "private" WiFi network may also be provided using a personal or company network component. Each WiFi network may include a respective operating area that relates to physical locations in which the station can be disposed to connect to the WiFi networks. The operating areas of the WiFi networks may be isolated or may overlap with other operating areas of different WiFi networks. When the station is located in an area in which more than one operating area overlaps, the station may connect to any WiFi network in which the operating area is present at the location of the station. With multiple possible WiFi networks for the station to connect, various different manners of selecting the wireless network have been devised such as a manual process and an automatic process. With an automatic process in which multiple WiFi networks are available, a more optimal WiFi network that the station connects is often the private network. Therefore, the station must be configured to properly determine the most optimal WiFi network to connect when multiple WiFi networks are available including both public and private WiFi networks.

DETAILED DESCRIPTION

Figure 1:
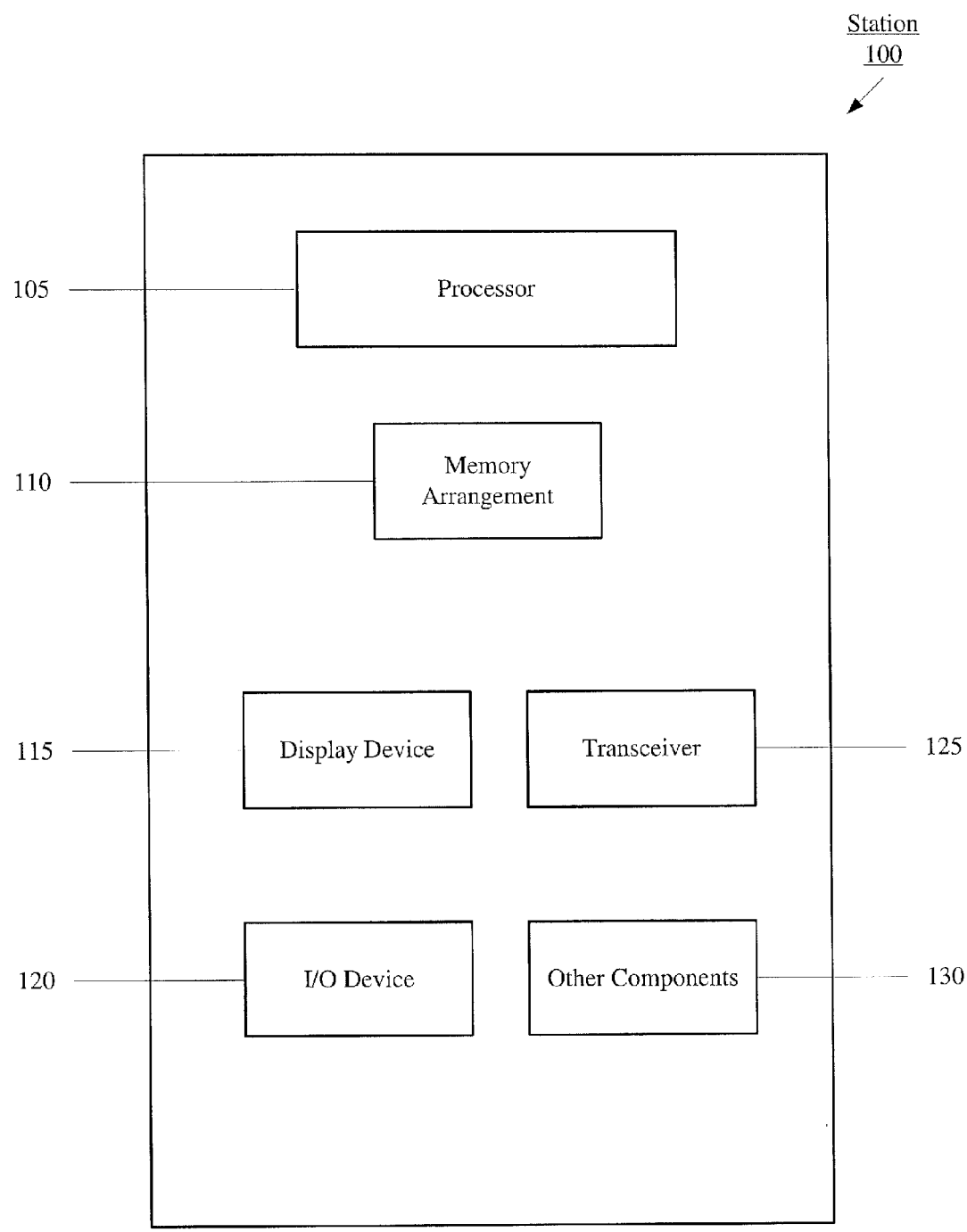
FIG. 1 shows an exemplary user equipment for automatically connecting to a wireless network.

The exemplary embodiments relate to a method and device comprising determining, by the processor, a plurality of WiFi networks that are available for a connection thereto; categorizing, by the processor, each one of the WiFi networks as one of a private WiFi network and a public WiFi network, the private WiFi network utilizing a first association process in which identification data of the device and an independent input is used to authorize a connection, the public WiFi network utilizing a second association process in which the identification data of the device is used to authorize a connection; executing a first automatic connection process using the first association process until a successful connection is established to one of the private WiFi networks based upon a first prioritized list; and executing a second automatic connection process until a successful connection is established to one of the public WiFi networks based upon a second prioritized list when the first automatic connection process to the private wireless networks is unsuccessful, wherein the first prioritized list is sorted as a function of a first predetermined order of preference for the private WiFi networks, and wherein the second prioritized list is sorted as a function of a second predetermined order of preference for the public WiFi networks.

The exemplary embodiments may be further understood with reference to the following description and the related appended drawings, wherein like elements are provided with the same reference numerals. The exemplary device and method relate to automatically connecting or associating with a WiFi network. Specifically, a priority is established as to which WiFi network a station is to connect based upon a variety of factors related to available wireless networks that are detected. The station, the WiFi networks, types thereof, the detection thereof, the connection thereto, the factors to prioritize the connection, and related methods will be explained in further detail below.

It should be noted that the terms "joining," "connecting," and "associating" are used interchangeably in the description below. Specifically, these terms relate to when the station joins a WiFi network. Those skilled in the art will understand that when the station joins a WiFi network, an association process is performed in order for the station to connect to the WiFi network. Those skilled in the art will also understand that the exemplary methods herein for the station to join the WiFi network may use any manner of association process and the exemplary methods encompass any form of association or procedure in which the station is to connect to the WiFi network.

As used herein, the terms "public" and "private" relate to different types of WiFi networks. The term "public" network may refer to a first type of WiFi network in which a first association process is utilized. Specifically, the public network utilizes an association process in which an identity of the station is transmitted (e.g., broadcast) in a probe request and received by a network component of the public network. Subsequently, the identity of the station is utilized to determine whether the station is authorized to access the public network. For example, the identity of the station may indicate credentials or other subscription type data that indicates a user of the station is a customer of the public network. Therefore, the ultimate determination to authorize a connection to the public network is a function of the identity of the station. Accordingly, the public network may refer to a HotSpot 2.0 network, a legacy HotSpot network (e.g., HotSpot 1.0), a co-located network, etc. The term "private" network may refer to a second type of WiFi network in which a second association process is utilized. Specifically, the private network utilizes an association process in which an identity of the station is also transmitted in a probe request and received by a network component of the private network. Subsequently, the private network that received the probe request may respond by requesting authorization data such as a password to be transmitted in order for the station to establish a connection to the private network. That is, the private network further requires an independent input for the connection to ultimately be established. Accordingly, the private network may refer to a WiFi network administered by a server or router within a home, a company, a building, etc. in which a password is used.

It should be noted that the public WiFi network may generally refer to any wireless network in which the first association process or a like process is utilized. Those skilled in the art will understand that the public WiFi network used herein may be applied to any wireless network in which the identity of the station is used as the sole indicator of whether a connection to the public WiFi network is authorized. In a substantially similar manner, the private WiFi network may generally refer to any wireless network in which the second association process or a like process is utilized. Those skilled in the art will understand that the private WiFi network used herein may be applied to any wireless network in which the identity of the station and a further independent field is required to determine whether a connection to the private WiFi network is authorized.

When a station detects multiple WiFi networks with which the station may possibly connect, the exemplary methods provide a manner in which the station may prioritize which WiFi network to connect such that an optimal experience is provided to the user. In particular, when the station automatically joins WiFi networks, the exemplary methods provide a manner in which to de-prioritize select WiFi networks over other, more optimal WiFi networks. For example, a private WiFi network may be preferred over public WiFi networks. When automatically joining WiFi networks, the exemplary methods relate to distinguishing the categories of WiFi networks that require particular notice. For example, a first category may be a set of private WiFi networks having overlapping operating areas having an associated priority list and a second category may be for public WiFi networks. As discussed above, conventional methods of selecting a WiFi network often entail a manual selection by the user in both categories. The exemplary methods provide a manner in which the station automatically joins an optimal WiFi network.

FIG. 1 shows an exemplary station 100 for automatically connecting to a WiFi network. The station 100 may be any portable device such as a mobile phone, a personal digital assistant, a smartphone, a tablet, a laptop, a barcode reader, etc. Accordingly, the station 100 may be a handheld device that allows the user to move the station 100 from location to location. In particular, the station 100 may be moved to various operating areas of WiFi networks. The station 100 may include a processor 105, a memory arrangement 110, a display device 115, an input/output (I/O) device 120, a transceiver 125, and other components 130. For example, the other components 130 may include a portable power supply (e.g., battery), a data acquisition device, ports to electrically connect the station 100 to other electronic devices, etc.

The processor 105 may be configured to execute a plurality of applications of the station 100. For example, the applications may include a web browser when connected to a communication network via the transceiver 125. In another example, the processor 105 may execute a WiFi network selection application to automatically join a WiFi network as determined according to the exemplary methods. The memory 110 may be a hardware component configured to store data related to operations performed by the station 100. Specifically, the memory 110 may store data related to WiFi networks, previous connections to WiFi networks, detected WiFi networks, priority data related to WiFi networks, association procedures for WiFi networks, etc. In a particular example, the memory 110 may store identity data of the station 100 that may indicate an owner or user of the station 100 as well as a unique indicator that identifies the station 100.

The display device 115 may be any component configured to show data to a user. The I/O device 120 may be any component configured to receive an input from the user. The display device 115 may incorporate the I/O device 120, particularly when the I/O device 120 is a touch sensing pad including an area in which the user may enter inputs. The display device 115 may further be configured to notify the user via data shown thereon of a status of connecting to a WiFi network. For example, the processor 105 may generate visual data to be shown on the display device 115 indicating that the station 100 is detecting available WiFi networks, attempting to connect to a WiFi network, and indicating that a connection with the WiFi network is established as well as indicating the identity of the WiFi network that is connected thereto. However, it should be noted that with an automatic joining of a WiFi network, the user may select a setting such that no visual data is generated and shown. Instead, only a network icon that is shown on the display device 115 may provide an indication that a connection to a WiFi network is established.

The transceiver 125 may be a hardware component configured to transmit and/or receive data. The transceiver 125 may therefore enable communication with other electronic devices directly or indirectly through a network. Specifically, the transceiver 125 may be configured to transmit signals such as a probe request to detect available WiFi networks and subsequently may transmit association signals to attempt to connect to the WiFi network. Once connected to the WiFi network, the transceiver 125 may transmit and receive data through the WiFi network. The processor 105 may be configured to execute the WiFi network selection application using the transceiver 125.

Figure 2:
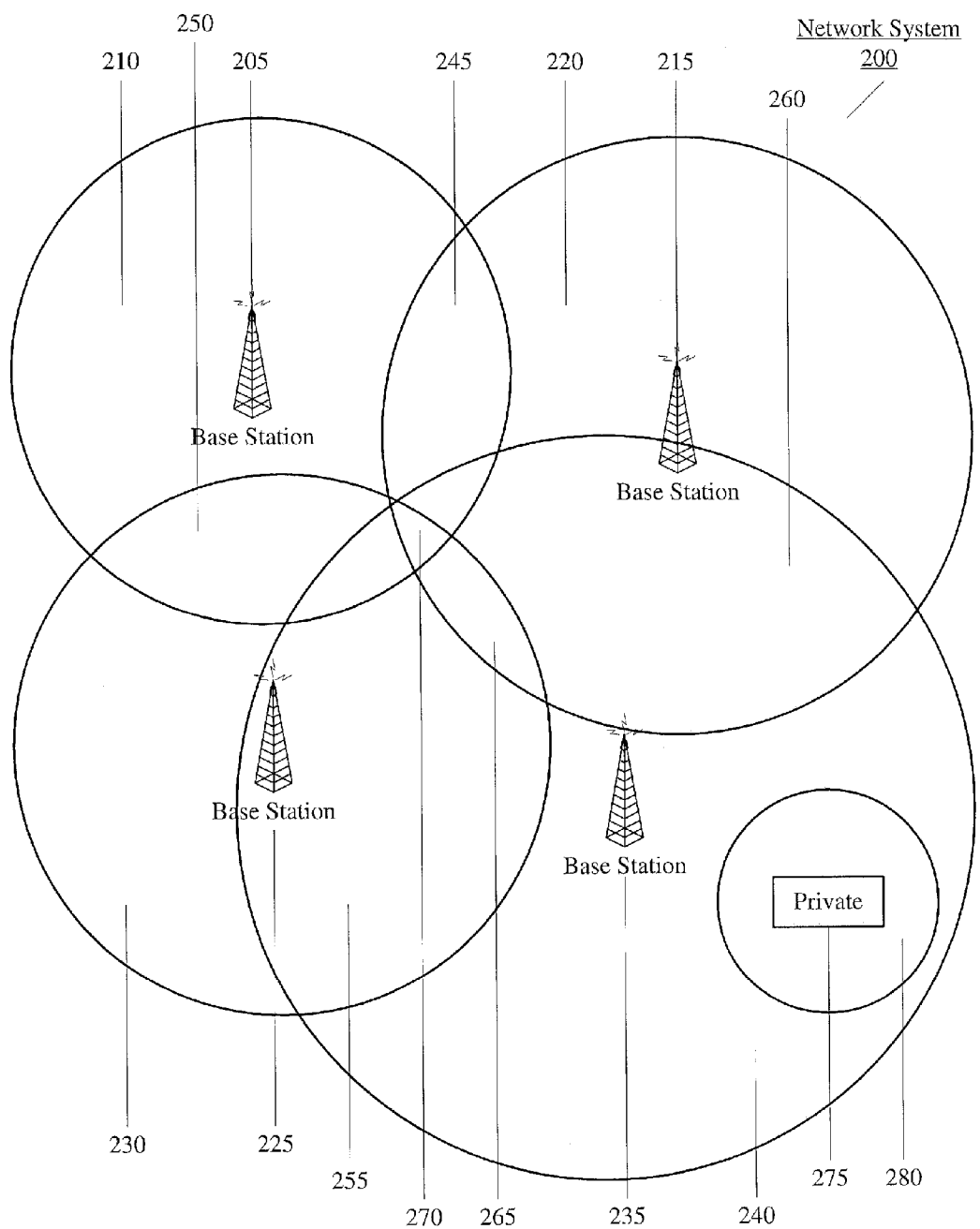
FIG. 2 shows an exemplary network system in which the user equipment of FIG. 1 is capable of connecting to a wireless network thereof.

FIG. 2 shows an exemplary network system 200 in which the station 100 of FIG. 1 is capable of connecting to a WiFi network thereof. The network system 200 includes a plurality of WiFi networks 205, 215, 225, 235, 275, each WiFi network having a respective operating area. The network system 200 illustrates an exemplary manner in which multiple WiFi networks may have operating areas that overlap in a given overall area. The network system 200 may include multiple public WiFi networks such as a base station 205 having an operating area 210, a base station 215 having an operating area 220, a base station 225 having an operating area 230, and a base station 235 having an operating area 240 as well as a private WiFi network such as a private network server 275 having an operating area 280.

It should be noted that the network system 200 of FIG. 2 is for illustrative purposes only. In a first respect, the network system 200 may include other network components that contribute to providing the respective operating area of the WiFi networks. For example, the base station 205 may utilize a network server, a network management arrangement, a database, signal amplifiers, etc. In a second respect, the operating areas of the network system 200 having a substantially circular area are only exemplary. Those skilled in the art will understand that an operating area of a WiFi network may be any shape, contiguous or separated, etc. In a third respect, the number of public WiFi networks and the number of private WiFi networks is only exemplary. Those skilled in the art will understand that for a given area, any number of public WiFi networks may have at least a portion of a respective operating area therein as well as any number of private WiFi networks having at least a portion of a respective operating area therein. In a fourth respect, the base stations 205, 215, 225, 235 being used for a public WiFi network while the private network server 275 being used for a private WiFi network is only exemplary. For example, the public WiFi network does not always necessarily have an operating area which is greater than that of the private WiFi network. In another example, the base stations 205, 215, 225, 235 may represent private WiFi networks while the private network server 275 may represent a public WiFi network. That is, the network system 200 used for illustrative purposes may have public WiFi networks and private WiFi networks that are shown in reverse in FIG. 2. Those skilled in the art will understand that a description relating to connecting to a public WiFi network may also apply to a private WiFi network and vice versa.

The public WiFi networks provided via the base stations 205, 215, 225, 235 having the operating areas 210, 220, 230, 240, respectively, may be any type of public WiFi network. As discussed above, the public WiFi network utilizes an association process in which the identity of the station 100 forms the basis of determining whether a connection to the public WiFi network is authorized. Also, as discussed above, the public WiFi network may be a 3 G network, a 4 G network, a LTE network, a HotSpot network, a HotSpot 2.0 network, etc. The private WiFi network provided by the private network server 275 having the operating area 280 may also be any type of WiFi network (e.g., LAN, WAN, etc.). As discussed above, the private WiFi network utilizes an association process in which the identity of the station 100 and an independent input or field (e.g., password) is used to determine whether a connection to the private WiFi network is authorized.

The network system 200 may also include multiple overlapping of operating areas. As illustrated, the operating area 210 may overlap with the operating area 220 in the overlap area 245; the operating area 210 may overlap with the operating area 230 in the overlap area 250; the operating area 230 may overlap with the operating area 240 in the overlap area 255; the operating area 220 may overlap with the operating area 240 in the overlap area 260; the operating area 220 may overlap with the operating area 230 which is further overlapped by the operating area 240 in the overlap area 265; and the operating area 210 may overlap with the operating area 220 which is further overlapped by operating area 230 and the operating area 240 in the overlap area 270. That is, the overlapping of operating areas may include two operating areas, three operating areas, four operating areas, etc.

Those skilled in the art will understand that the public WiFi networks and the private WiFi networks of the network system 200 may operate on a respective channel. Specifically, the channel may be a set of continuous frequencies (often within a given band based upon the type of network) in which the WiFi network operates. Accordingly, the station 100 may include an antenna (not shown but included within the other components 130) coupled to the transceiver 125. The antenna may enable the transceiver 125 to operate on the various frequencies such that the station 100 transmits and receives data with the WiFi network on the channel thereof.

The station 100 may be disposed within any part of the overall area of the network system 200. For example, if the station 100 is disposed in a part of the overall area where only the operating area 210 is disposed, the station 100 may detect that the only available WiFi network is that provided by the base station 205. In another example, if the station 100 is disposed in the overlap area 260, the station 100 may detect that the available WiFi networks are the WiFi networks provided by the base station 215 and the base station 235. In yet another example, if the station 100 is disposed in the overlap area 265, the station 100 may detect that the available WiFi networks are the WiFi networks provided by the base station 215, the base station 225, and the base station 235. In a further example, if the station 100 is disposed in the overlap area 270, the station 100 may detect that the available WiFi networks are the WiFi networks provided by the base station 205, the base station 215, the base station 225, and the base station 235.

The above description relates to when the station 100 is disposed in some part of the overall area in which only public WiFi networks are available. However, the station 100 may be disposed in an area where at least one private WiFi network is available. As discussed above, the public WiFi networks and the private WiFi network of the network system 200 may be reversed. Accordingly, a substantially similar scenario may be present for the station 100 with regard to private networks.

The above descriptions also relate to when the station 100 is disposed in some part of the overall area in which only one type of WiFi network is available. However, the station 100 may be disposed in an area where at least one public WiFi network and at least one private WiFi network are available. For example, the station 100 may be disposed in the operating area 280. Accordingly, the station 100 may detect that the available WiFi networks are the WiFi networks provided by the base station 235 and the private network server 275.

The above descriptions provide the various different scenarios that exist when the station 100 is disposed in some part of the overall area of the network system 200 which includes both public WiFi networks and private WiFi networks. It is often the case that a private WiFi network provides an optimal experience for the user. For example, a connection to a private WiFi network may provide data to be exchanged at a higher exchange rate. In another example, a connection to a private WiFi network may limit a number of users to be connected thereto which ultimately increases an overall bandwidth that is available to the user. Even among multiple private WiFi networks, there may be a preference for one private WiFi network over other private WiFi networks. A user may manually designate a priority order in which to connect to private WiFi networks that have overlapping operating areas in which the station 100 is disposed. The same applies to public WiFi networks. For example, according to a first naming convention, a HotSpot 2.0 network may be preferred over a HotSpot network which may be preferred over a LTE network which may be preferred over a 4 G network which may be preferred over a 3 G network (which may be preferred over an analog network). Those skilled in the art will understand that based upon the naming convention or standard (e.g., IEEE), various differences exist such as the LTE network and the 4 G network referring to the same type of network; a LTE Advanced network being included; etc. Depending on which WiFi network is detected based upon the disposition of the station 100 within the overall area of the network system 200, the exemplary methods provide a manner in which the station 100 automatically connects to an optimal WiFi network such that a better user experience is provided.

It should be noted that current WiFi standards include private WiFi networks that provide a more optimal wireless network to connect. Accordingly, the exemplary methods described herein relate to the standard for experience in which the private WiFi networks are more optimal than a public WiFi network. However, those skilled in the art will understand that steps of the exemplary methods may also be rearranged such that a public WiFi network may be prioritized over a private WiFi network, especially when a public WiFi network is known to provide a more optimal WiFi network for the station 100.

Figure 3:
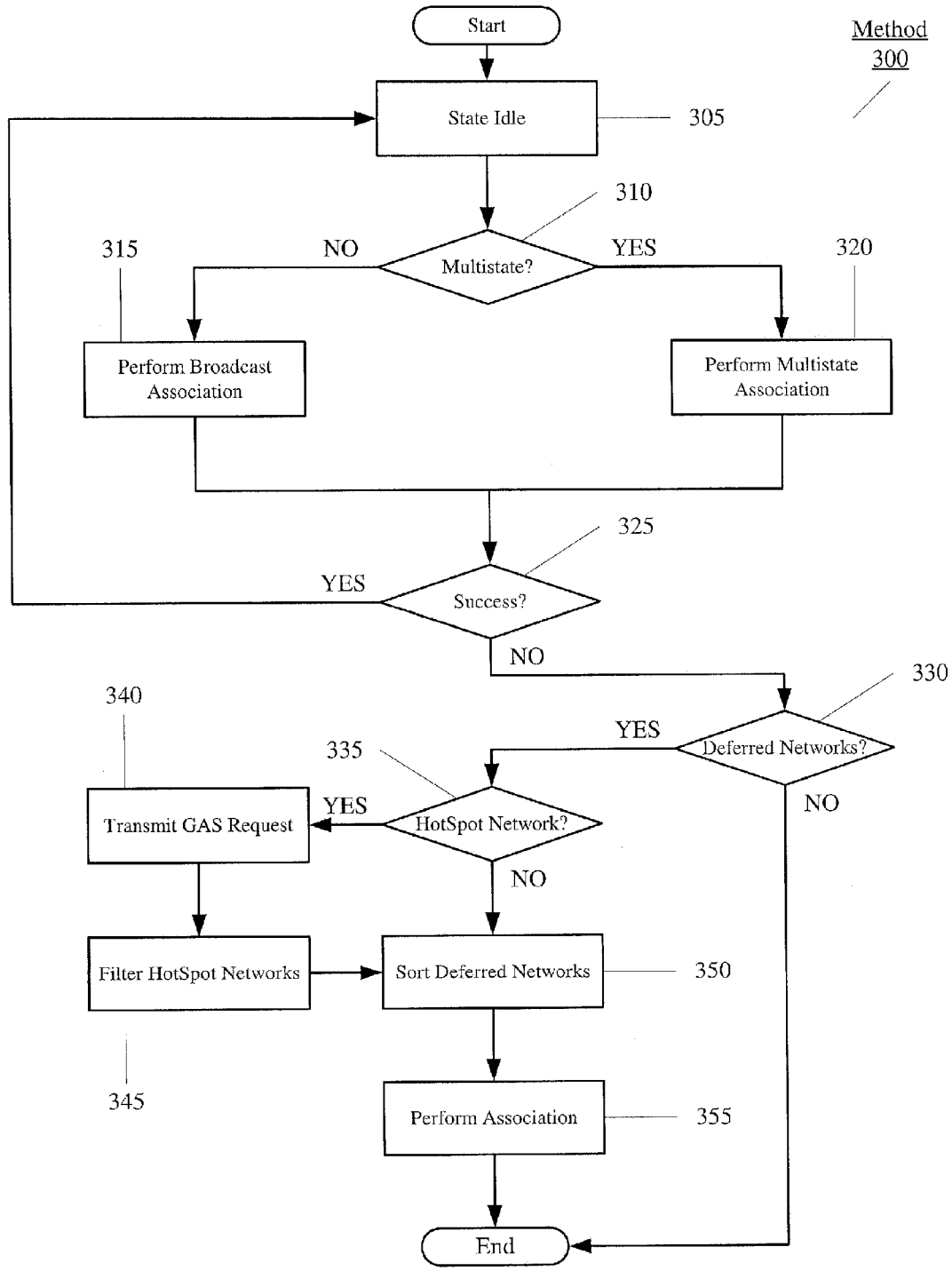
FIG. 3 shows an exemplary method for connecting to a wireless network.

FIG. 3 shows an exemplary method 300 for connecting to a WiFi network. Specifically, the method 300 relates to an overall manner in which the station 100 connects to an optimal WiFi network when multiple available WiFi networks are detected. Specific steps of the method 300 will be described in further detail below with regard to FIGS. 4-7. The method 300 will be described with reference to the station 100 of FIG. 1 and the network system 200 of FIG. 2.

In step 305, the station 100 is in an idle state. Specifically, the idle state may relate to whether the processor 105 is currently executing the network selection application. In step 305, a connection to a wireless network is not yet being performed, thereby placing the processor 105 in an idle state with regard to the processor 105 and the transceiver 125.

Once the station 100 is to connect to a WiFi network, the method 300 continues to step 310. In step 310, a determination is made as to whether a multistate association is to be performed or a broadcast association is to be performed. A broadcast association relates to determining available networks using a broadcast signal (e.g., probe request) regardless of initially determining any known available WiFi networks. A multistate association relates to a multiple phase method in which a first scan is performed (e.g., one channel), a second scan is performed (e.g., select channels), and a third scan is performed (e.g., remaining channels). Each association manner possesses different characteristics. For example, when a station 100 is first activated, there are no known WiFi networks. Accordingly, a broadcast association may provide more appropriate results. In another example, when a station 100 has already associated with a variety of different WiFi networks thereby having known WiFi networks, the multistate association method may provide more efficient results. Thus, if a broadcast association is performed, the method 300 continues to step 315 while if a multistate association is performed, the method continues to step 320. Steps 315 and 320 will be described in further detail below with regard to FIGS. 4 and 5, respectively. After performing either the broadcast association (step 315) or the multistate association (step 320), the method 300 continues to step 325 to determine whether the association was successful in connecting to a WiFi network.

Figure 4:
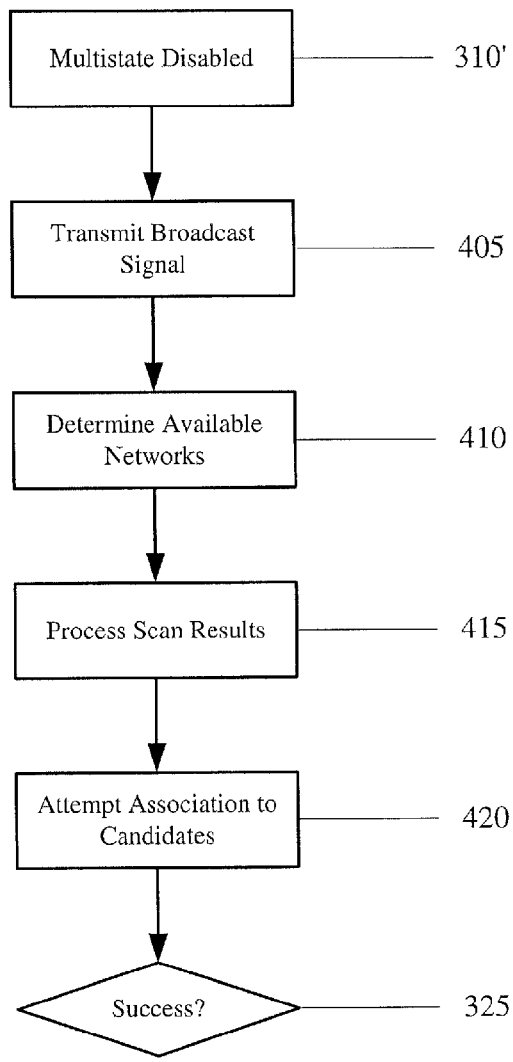
FIG. 4 shows an exemplary broadcast association method for connecting to a wireless network.

FIG. 4 shows an exemplary broadcast association method 400 for connecting to a WiFi network. As discussed above in step 315 of the method 300, the broadcast association is performed. Thus, the method 400 starts in step 310' in which the multistate association is disabled. For example, in the network selection application, the processor 105 may disable the multistate association setting.

In step 405, a broadcast signal is transmitted. Specifically, the broadcast signal may be a probe request with a wildcard service set identifier (SSID) transmitted on all known channels to detect any available WiFi network. Those skilled in the art will understand that any discovery process may be used in association with the broadcast signal. For example, the broadcast signal may be a ping transmitted by the station 100 and received by at least one base station. The base station may return a signal to the station 100 to indicate the identity of the WiFi network that is available to the station 100 in its current disposition.

In step 410, the available WiFi networks are determined. For example, the network selection application may include a predetermined time period in which a return signal is allowed to be received. Specifically, when the broadcast signal is a probe request, the return signal may be a probe response. Accordingly, the station 100 may only determine the WiFi networks to be available if the return signal is received within the predetermined time period. In a specific example in which the station 100 is disposed in overlap area 265, the station 100 may transmit the broadcast signal. The station 100 may receive a return signal from the base station 220 and the base station 225. However, the base station 235 may not be able to transmit the return signal due to a variety of reasons despite the station 100 being within the limits of the operating area 240 (e.g., signal degradataion, high traffic, etc.). Therefore, the network selection application may determine that the WiFi networks provided by the base station 215 and the base station 225 are the only available WiFi networks.

Upon generating a list of available WiFi networks, the method 400 continues to step 415. In step 415, the scan results are processed by the network selection application. Step 415 will be described in further detail below with reference to FIG. 6. Once the scan results are processed, the method 400 continues to step 420. In step 420, the network selection application attempts to connect to a candidate WiFi network determined from processing the scan results. Step 420 will be described in further detail below with reference to FIG. 7. After step 420, the method 400 continues to step 325 of the method 300.

It should be noted that the broadcast association method 400 may include further steps. For example, the broadcast association method 400 may include a legacy scan. Accordingly, prior to transmitting the broadcast signal in step 405, a preliminary step may be used between steps 310' and 405 in which a legacy scan is performed. Specifically, a signal is broadcast on a specific channel utilized by a particular wireless network. The WiFi network may be the last previously used WiFi network, a known WiFi network, etc. Subsequently, the method 400 may further include steps 415 and 420 after this legacy scan step. If unsuccessful, the method 400 may continue to step 405 in which the broadcast signal is transmitted.

Figure 5:
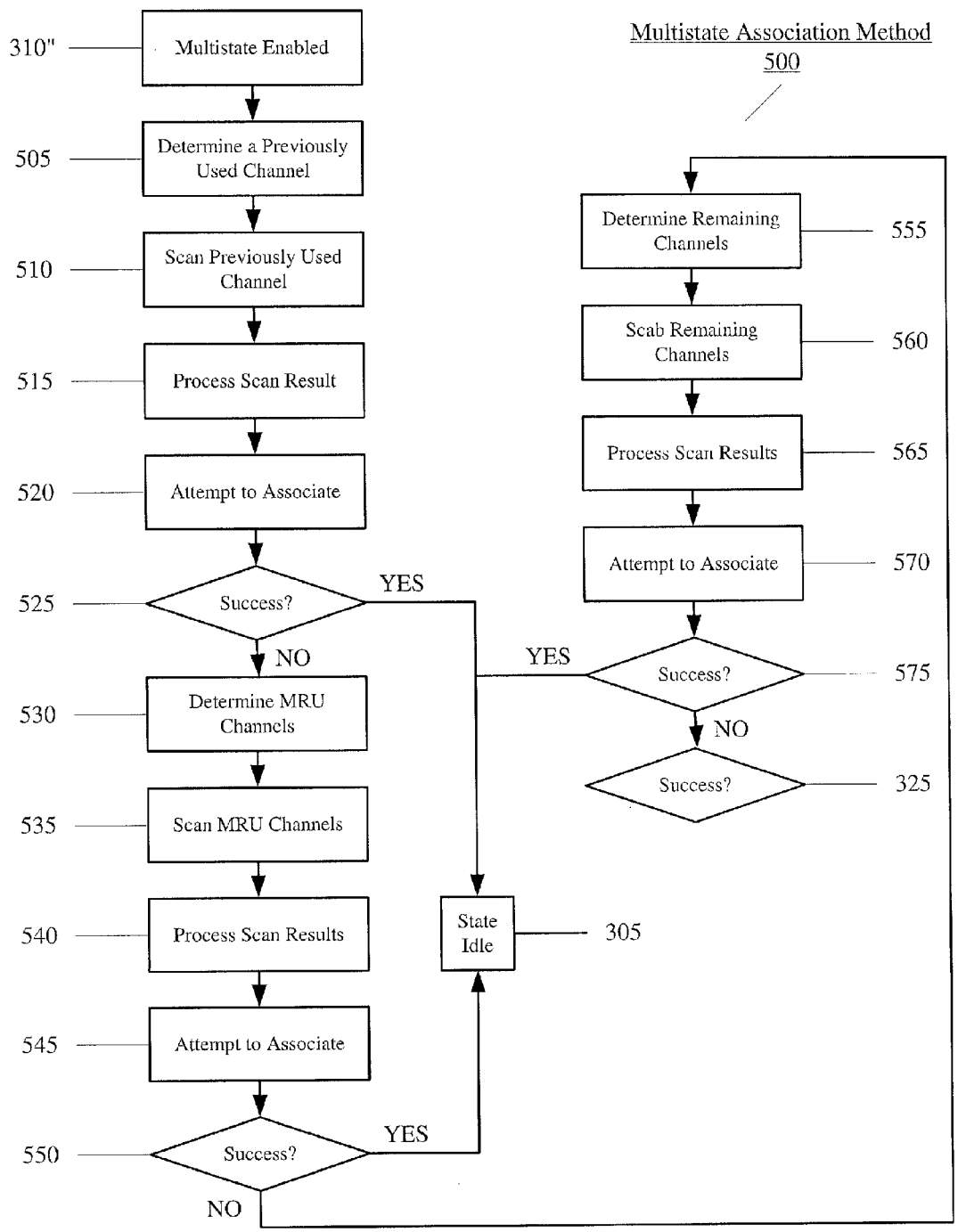
FIG. 5 shows an exemplary multistate association method for connecting to a wireless network.

FIG. 5 shows an exemplary multistate association method 500 for connecting to a WiFi network. As discussed above in step 315 of the method 300, the multistate association is performed. Thus, the method 500 starts in step 310" in which the multistate associated is enabled. For example, in the network selection application, the processor 105 may enable the multistate association setting. Also as discussed above, the multistate association is performed using a step process.

The first step in the multistate association relates to a previously used channel. Therefore, the "last" channel that was utilized to connect to a WiFi network is used in the first step. It should be noted that it may be assumed that the station 100 has previously associated with at least one WiFi network. That is, if the station 100 has not previously connected to a WiFi network, there is no previously used channel or "last" channel.

In step 505, the previously used or "last" channel is determined. For example, the network selection application may store network related data in the memory 110 including the "last" channel. The processor 105 may retrieve the data stored in the memory 110 to determine the channel that was used to previously connect to a WiFi network. Specifically, the very last channel that was used to connect to the WiFi network. It should be noted that this "last" channel is only exemplary. The exemplary methods may utilize any previously used channel (e.g., most often used channel) in the first step of the multistate association. In step 510, the previously used channel is scanned.

In step 515, the scan result is processed by the network selection application. Step 515 will be described in further detail below with reference to FIG. 6. Step 515 substantially corresponds to step 415 of the method 400 of FIG. 4. Once the scan results are processed, the method 500 continues to step 520. In step 520, the network selection application attempts to connect to a candidate WiFi network determined from processing the scan result. In the first set of steps 505-525 of the multistate association, it should be noted that a single previously used channel is used for the scan. Therefore, the scan result relates to this one channel and the attempt to associate is with regards to this one channel. Step 520 will be described in further detail below with reference to FIG. 7. Step 520 substantially corresponds to step 420 of the method 400. After step 520, the method 500 continues to step 525 to determine whether the association using the previously used channel is successful. If successful, the method 500 continues to step 305 of the method 300 in which the station 100 is placed in the idle state. If unsuccessful, the method 500 continues to step 530 to perform the second step of the multistate association.

The second set of steps 530-550 in the multistate association relates to at least one most recently used channel. Therefore, when the station 100 has connected to multiple WiFi networks using a respective channel, these previously used channels are used in the second step. It should be noted that it may be assumed that the station 100 has previously associated with at least one further WiFi network (beyond the "last" channel used in the first step). That is, if the station 100 has not previously connected to at least one further WiFi network, there is no channel that qualifies as one that was also recently used.

The second set of steps may include steps that are substantially similar to the first step. In step 530, the most recently used channels are determined. Again, the processor 105 may retrieve the data stored in the memory 110 to determine the most recently used channels, in particular using a time stamp associated with the channel. The number of most recently used channels may be predetermined using a variety of factors. For example, the last four (4) channels that were most recently used (beyond the "last" channel of step one) may be determined as the most recently used channels. In step 535, the most recently used channels are scanned.

In step 540, the scan result is processed by the network selection application. Step 540 will be described in further detail below with reference to FIG. 6 as this step substantially corresponds to step 515. Once the scan results are processed, the method 500 continues to step 545. In step 545, the network selection application attempts to connect to a candidate WiFi network determined from processing the scan result. Step 545 will be described in further detail below with reference to FIG. 7 as this step substantially corresponds to step 520. After step 545, the method 500 continues to step 550 to determine whether the association using the most recently used channels is successful. If successful, the method 500 continues to step 305 of the method 300 in which the station 100 is placed in the idle state. If unsuccessful, the method 500 continues to step 555 to perform the third step of the multistate association.

The third set of steps 555-575 in the multistate association relates to all remaining channels. The remaining channels for a given band may be determined by the network selection application by initially determining all available channels in the band and removing the channels already used in the first step (e.g., the "last" channel) and the second step (e.g., the most recently used channels).

The third step may include steps that are substantially similar to the first and second steps. In step 555, the remaining channels are determined. Again, the processor 105 may retrieve the data stored in the memory 110 to determine the remaining channels. In step 560, the most recently used channels are scanned. In step 565, the scan result is processed by the network selection application. Step 565 will be described in further detail below with reference to FIG. 6 as this step substantially corresponds to step 515. Once the scan results are processed, the method 500 continues to step 570. In step 570, the network selection application attempts to connect to a candidate WiFi network determined from processing the scan result. Step 570 will be described in further detail below with reference to FIG. 7 as this step substantially corresponds to step 520. After step 570, the method 500 continues to step 575 to determine whether the association using the remaining channels is successful. If successful, the method 500 continues to step 305 of the method 300 in which the station 100 is placed in the idle state. If unsuccessful, the method 500 continues to step 325 of the method 300.

Figure 6:
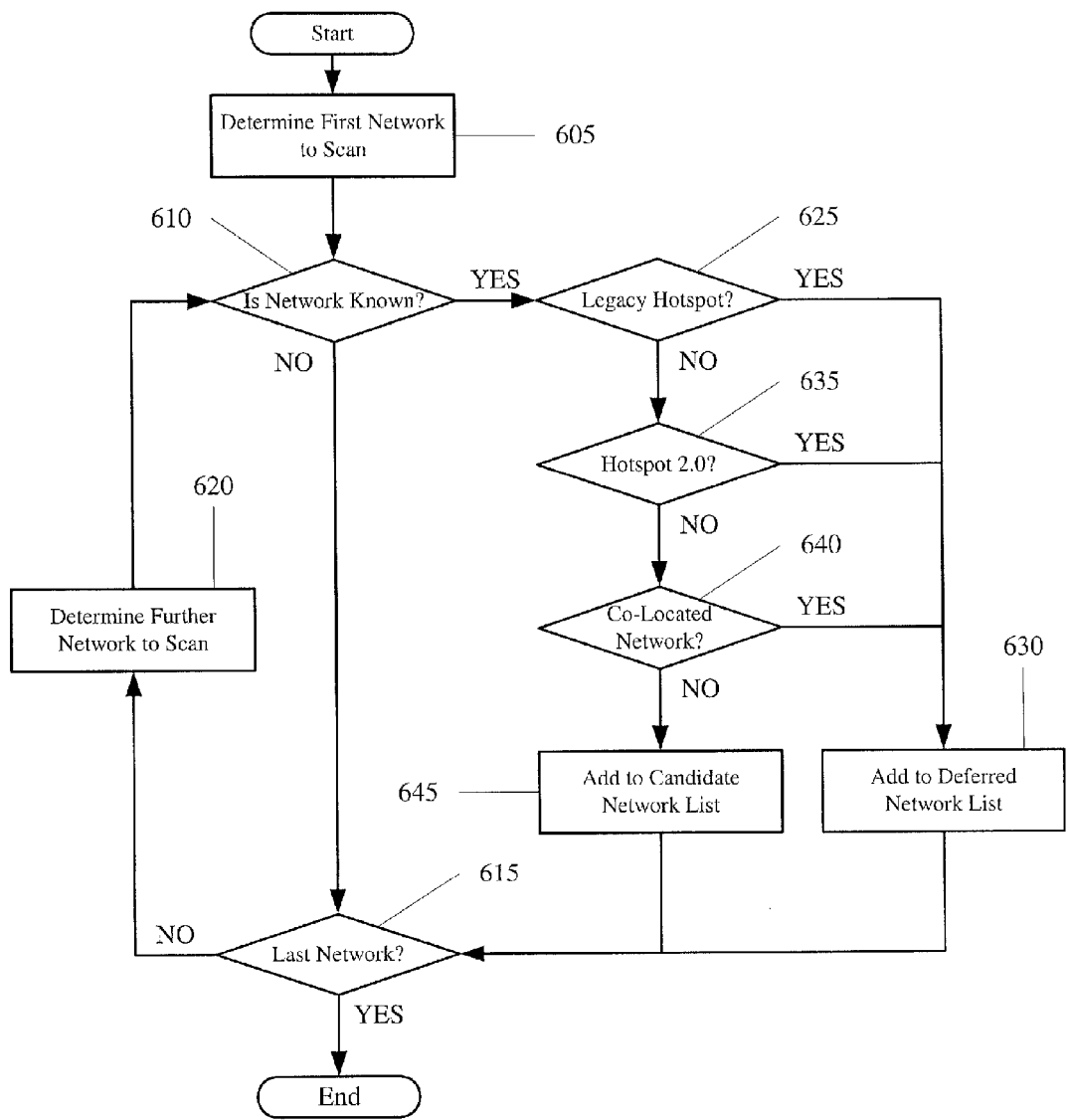
FIG. 6 shows an exemplary process scan result method for generating network lists.

FIG. 6 shows an exemplary process scan result method 600 for generating network lists. As discussed above, the broadcast association method 400 and the multistate association method 500 include a step in which scan results are processed. Specifically, the method 400 includes step 415 (and optionally another step when a legacy scan is performed) and the method 500 includes steps 515, 540, 565 in which the scan results are processed.

In step 605, a first network to scan is determined. Assuming no legacy scan is being performed in the method 400, the first network to scan in the broadcast association may be determined on a variety of factors. For example, a random selection may be made, a previously used channel may be selected, a most often used channel may be selected, etc. It should be noted that this step is relative to when the method 600 is being performed in the method 500. The first network to scan in the multistate association in the first step may be the "last" channel. Again, only one channel is to be scanned. The first network to scan in the multistate association in the second set of steps relates to the most recently used channels in which one may be selected on a substantially similar basis as the factors used in the broadcast association. The first network to scan in the multistate association in the third set of steps relates to remaining channels in which the factors used in the broadcast association may again be used.

In step 610, a determination is made as to whether the first network to scan is known. With regard to the broadcast association, the memory 110 may store the network related data indicating whether the channel has been previously used or is known. With regard to the multistate association, the memory 110 may again store the network related data. However, it may be assumed that the channel of the first step ("last" channel) and the second step (most recently used channels) are known channels. The network related data may indicate whether any of the remaining channels are known.

If the determination indicates that the network to be scanned is not known, the method 600 continues to step 615. In step 615, a determination is made whether the WiFi network is the last network to be scanned. With regard to the broadcast association, the broadcast signal that is transmitted may determine at least one channel is to be scanned based upon the number of return signals that are received. If only a single channel is to be scanned and it is not known, the method 600 ends. If further channels are to be scanned, the method 600 continues to step 620 in which a further network to be scanned is determined. Again, substantially similar factors may be used to determine the further network to be scanned. With regard to the multistate association, step 610 primarily relates to the third step in which the remaining channels are used for the scanning. Again, the "last" channel and the most recently used channels may be assumed to be known, thereby step 610 resulting in an affirmative determination. The remaining channels of the multistate association may have a substantially similar analysis as the channels in the broadcast association. In this respect, steps 615 and 620 provide a manner for all the available channels to be analyzed.

Returning to step 610, if the network to be scanned (first network from step 605 or further network from step 620) is known, the method 600 continues to step 625. The subsequent steps are used to generate candidate lists for the method 700 described below. In step 625, a determination is made whether the network to be scanned is a legacy HotSpot network. That is this determination indicates whether the network to be scanned is a public WiFi network and one that has already been connected thereto. If the network to be scanned is a legacy HotSpot network, the method 600 continues to step 630 in which this network is added in a deferred network list. If the network to be scanned is not a legacy HotSpot network, the method 600 continues to step 635.

In step 635, a determination is made whether the network to be scanned is a HotSpot 2.0 network. A HotSpot 2.0 (also referred to as "Passpoint") defines technology by which WiFi access points are linked into a large network through a web of interconnections, thereby enabling users to seamlessly move between WiFi networks from almost any location. HotSpot 2.0 is, defined by the Wi-Fi Alliance and may utilize IEEE 802.11u protocols and/or other protocols. Therefore, although not a legacy HotSpot network, this determination may indicate that the network to be scanned is in some way associated to a previously connected WiFi network. If the network to be scanned is a HotSpot 2.0 network, the method 600 continues to step 630 in which this network is added in a deferred network list. If the network to be scanned is not a HotSpot 2.0 network, the method 600 continues to step 640.

In step 640, a determination is made whether the network to be scanned is a co-located network. That is, this determination indicates whether the network to be scanned is a network in which the hardware and equipment to provide the WiFi network are being housed in a dedicated facility. Therefore, this determination may indicate that the network to be scanned is still a public WiFi network. If the network to be scanned is a co-located network, the method 600 continues to step 630 in which this network is added in a deferred network list. If the network to be scanned is not a co-located network, the method 600 continues to step 645. In step 645, the network to be scanned is added to a candidate network list. The candidate network list may represent a list of private WiFi networks. After step 630 or step 645, the method 600 continues to step 615 as discussed above.

It should be noted that the use of the Legacy HotSpot network, the HotSpot 2.0 network, and the co-located network is only exemplary. Those skilled in the art will understand that any further public WiFi network that satisfies the above described association process may be included within the method 600.

Figure 7:
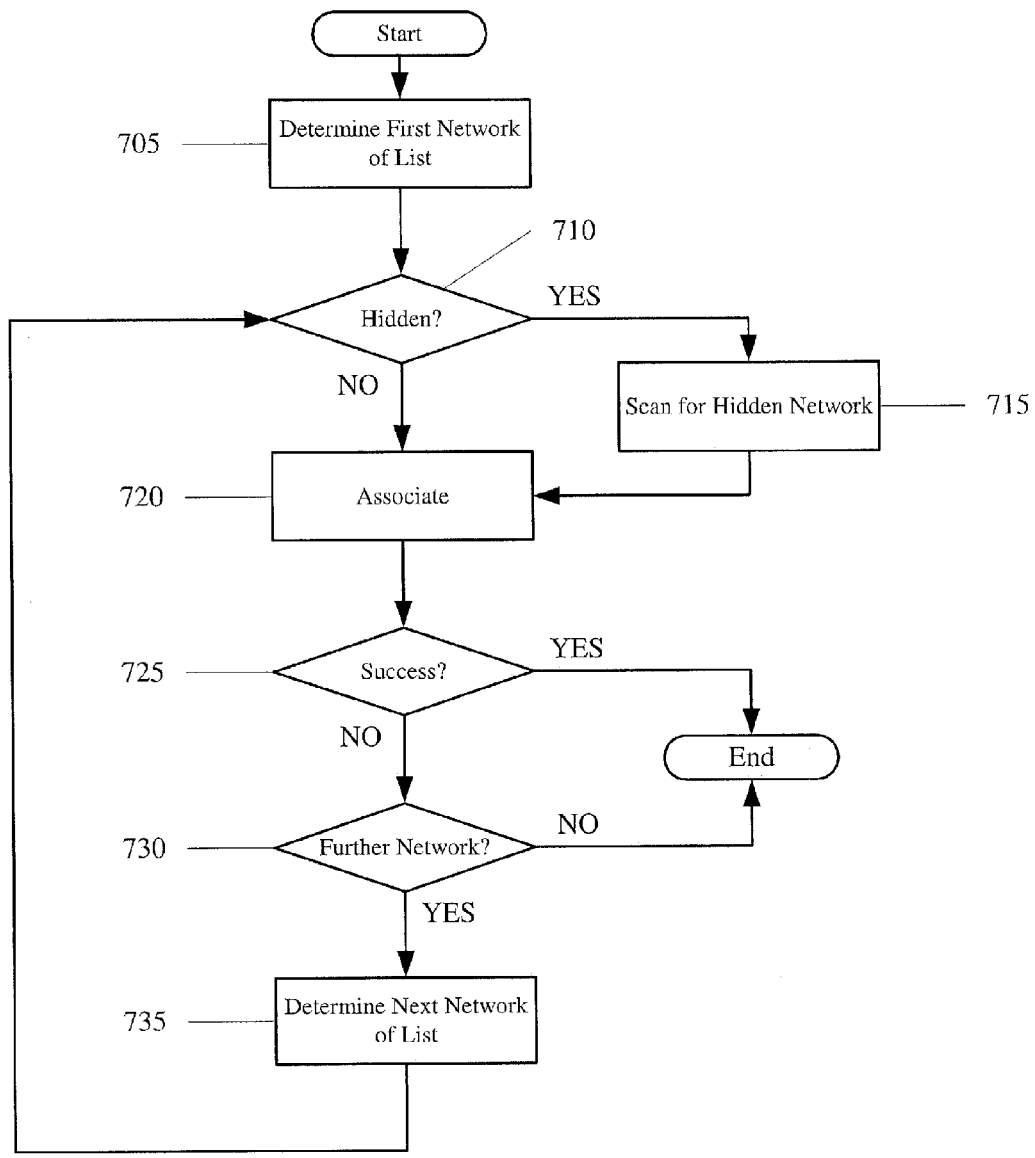
FIG. 7 shows an exemplary association attempt method for connecting to a wireless network.

FIG. 7 shows an exemplary association attempt method 700 for connecting to a wireless network. As discussed above, the broadcast association method 400 and the multistate association method 500 include a step in which an association is attempted to a selected network. Specifically, the method 400 includes step 420 (and optionally another step when a legacy scan is perform) and the method 500 includes steps 520, 545, 570 in which the attempts are performed. Specifically, the candidate network list generated in step 645 of the method 600 is used in the method 700.

In step 705, the first network of the candidate network list is determined. It should be noted that there are a variety of manners in which to select the first network of the candidate network list. For example, the order used to generate the candidate network list may be used, the factors discussed above in determining the network to be scanned may be used, a predetermined priority list of networks may be used, etc. In step 710, a determination is made whether this network is hidden. As discussed above, the networks in the candidate network list relate to private WiFi networks. Private WiFi networks may include a setting in which the network may be hidden such that their identification (e.g., SSID) is not broadcast from discovery signals being broadcast. When a network is hidden, the station 100 may be aware of its existence if it had previously connected thereto, thereby further being aware of a manner to detect this network. Thus, if the network is hidden, the method 700 continues to step 715 in which a scan is performed to detect the hidden network.

In step 720, the station 100 attempts to associate with the selected network of the candidate network list. As discussed above, the association process for the private WiFi network includes transmitting an identity of the station 100 as well as an independent input. In step 725, a determination is made whether the station 100 has successfully associated with the selected WiFi network. If successful, the method 700 ends. However, if unsuccessful, the method 700 continues to step 730. In step 730, a determination is made whether further networks exist in the candidate network list. If no further networks are available, the method 700 ends. However, if there are further networks, the method 700 continues to step 735 in which the next network in the candidate network list is determined. Subsequently, the method 700 returns to step 710. In this manner, each network of the candidate network list may be used to attempt an association when a previous attempt is unsuccessful.

The above described exemplary methods provide a manner for the station 100 to initially attempt to connect to a private WiFi network which is often a more optimal experience for the user. However, if no connection to a private WiFi network is established at the end of the above described exemplary methods, the station 100 may still attempt to connect to a public WiFi network.

Returning to the method 300 of FIG. 3, specifically step 325, should step 325 indicate that a connection to a private WiFi network was unsuccessful, the method 300 continues to step 330. As discussed above, the method 500 and the method 600 conclude with a return to step 325 of the method 300. Specifically, the return to step 325 is indicative of unsuccessful attempts to join a private WiFi network. Therefore, if successful, the method 300 returns to step 305 where the station 100 is in an idle state. However, if unsuccessful, the method 300 continues to step 330.

In step 330, a determination is made whether a deferred network list was generated in step 630 of the method 600. As the candidate network list related to private WiFi networks, the deferred network list relates to public WiFi networks. If no networks are included in the deferred network list, the method 300 ends. That is, the station 100 was unsuccessful in connecting to a private WiFi network and since there are no deferred networks, the station was also unsuccessful in connecting to a public WiFi network.

If a deferred network list was generated, the method 300 continues to step 335. In step 335, a determination is made whether a HotSpot network is included therein. Specifically, this step may relate to initially determining whether a HotSpot 2.0 network is available and subsequently determining whether a legacy HotSpot network is available. It should be noted that it may be assumed in this example that a more optimal experience is provided with a HotSpot 2.0 network over a legacy HotSpot network. However, the reverse scenario may also exist and incorporated into the method 300. Overall, a HotSpot network may be a most optimal selection among the public WiFi networks. Therefore, this step determines whether any HotSpot networks are available.

If a HotSpot network is available in the deferred network list, the method 300 continues to step 340. In step 340, a generic advertisement service (GAS) request is transmitted to the selected HotSpot network. The GAS request may be any request or data packet transmitted for association with the HotSpot network. Specifically, the GAS request may be the passport for association with the HotSpot network. For example, IEEE 802.11u protocols may indicate the manner in which the GAS request is performed. In step 345, the HotSpot networks of the deferred network list are filtered. In step 350, the networks of the deferred network list are sorted in order of priority. As discussed above, the public WiFi networks may have respective priorities in terms of connection thereto. Using a priority list, in step 355, the network selection application attempts to associate with a public WiFi network based upon the sorting of the networks in the deferred network list. The attempt to associate with the public WiFi network may be substantially similar to the method 700 described above in FIG. 7.

The exemplary embodiments provide a device and method for automatically joining a WiFi network. In particular, the exemplary methods enable a station to automatically join a WiFi network when multiple available WiFi networks have been detected. For example, the station may be disposed in location in which multiple operating areas of respective WiFi networks overlap. The exemplary methods provide a manner for the station to automatically join the most optimal WiFi network given the available WiFi networks. In an exemplary ordering of types of WiFi networks, the station may initially attempt to join a private WiFi network, followed by a HotSpot 2.0 network, then followed by a legacy HotSpot network, and may also entail attempt to join a LTE network, a 4 G network, and a 3 G network when the previous attempts are unsuccessful.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described methods may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method at a device that includes a processor and a wireless transceiver, comprising:
    transmitting a probe request to determine WiFi networks that are available for a connection to the device;
    receiving a probe response from a plurality of the WiFi networks;
    categorizing, by the processor, each one of the plurality of WiFi networks as one of a private WiFi network or a public WiFi network, the private WiFi network utilizing a first association process in which identification data of the device and an independent input is used to authorize a connection, the public WiFi network utilizing a second association process in which the identification data of the device is used to authorize a connection;
    determining that the plurality of WiFi networks includes a private WiFi network that is hidden when the private WiFi network broadcasts a probe response that does not comprise an identification;
    scanning, responsive to the determining that the private WiFi network is hidden, for the private WiFi network based at least in part on information from a previous connection between the private WiFi network and the device;
    when at least one of the plurality of the WiFi networks is categorized as a private WiFi network, executing a first automatic connection process using the first association process to attempt to connect to the private WiFi network based upon a first prioritized list;
    when the attempt to connect to the one of the private WiFi networks is unsuccessful, repeating the executing of the first automatic connection process for ones of the categorized private WiFi networks, based upon the first prioritized list, until a successful connection is established with one of the private WiFi networks or until the first automatic connection process is unsuccessful for all of the categorized private WiFi networks; and
    when the first automatic connection process is unsuccessful for all of the categorized private WiFi networks, executing a second automatic connection process until a successful connection is established to one of the public WiFi networks based upon a second prioritized list,
    wherein the first prioritized list is sorted as a function of a first predetermined order of preference for the private WiFi networks, and
    wherein the second prioritized list is sorted as a function of a second predetermined order of preference for the public WiFi networks.

2. The method of claim 1, wherein the identification data of the device includes at least one of an identity of a user of the device or an identity of the device.

3. The method of claim 1, wherein the independent input is a password.

4. The method of claim 1, further comprising:
    generating the first and second prioritized lists as a function of the received probe responses.

5. The method of claim 1, further comprising:
    transmitting a first probe request on a previously used channel within a band to determine whether one of the WiFi networks using the previously used channel is available for the connection; and
    receiving a first probe response from the WiFi network using the previously used channel.

6. The method of claim 5, further comprising:
    transmitting a second probe request on a plurality of most recently used channels within the band to determine whether further ones of the WiFi networks using the most recently used channels are available for the connection; and receiving a second probe response from the WiFi networks using the most recently used channels.

7. The method of claim 6, further comprising:
transmitting a third probe request on a plurality of remaining channels within the band to determine whether still further ones of the WiFi networks using the remaining channels are available for the connection; and
receiving a third probe response from the WiFi networks using the remaining channels.

8. The method of claim 7, further comprising:
generating the first and second prioritized lists as a function of the first, second, and third probe responses.

9. The method of claim 1, wherein the public WiFi networks include a legacy HotSpot network, a HotSpot 2.0 network, and a co-located network and wherein the second prioritized list is sorted with the HotSpot 2.0 network having a highest priority, the legacy HotSpot network having an intermediate priority, and the co-located network having a lowest priority.

10. The method of claim 1, wherein the performing association with the first prioritized list further comprises a scan when at least one of the private WiFi networks is hidden.

11. A device, comprising:
a transceiver configured to communicate wireless data; and
a processor;
wherein the processor and transceiver are configured to automatically connect to one of a plurality of WiFi networks by:
transmit a probe request to determine WiFi networks that are available for a connection to the device;
receive a probe response from a plurality of WiFi networks;
categorizing each one of the plurality of WiFi networks as one of a private WiFi network or a public WiFi network, the private WiFi network utilizing a first association process in which identification data of the device and an independent input is used to authorize a connection, the public WiFi network utilizing a second association process in which the identification data of the device is used to authorize a connection;
determine that the plurality of WiFi networks includes a private WiFi network that is hidden when the private WiFi network broadcasts a probe response that does not comprise an identification;
scan, responsive to the determining that the private WiFi network is hidden, for the private WiFi network based at least in part on information from a previous connection between the private WiFi network and the device;
when at least one of the plurality of the WiFi networks is categorized as a private WiFi network, executing a first automatic connection process using the first association process to attempt to connect to the private WiFi network based upon a first prioritized list;
when the attempt to connect to the one of the private WiFi networks is unsuccessful, repeating the executing of the first automatic connection process for ones of the categorized private WiFi networks, based upon the first prioritized list, until a successful connection is established with one of the private WiFi networks or until the first automatic connection process is unsuccessful for all of the categorized private WiFi networks; and when the first automatic connection process is unsuccessful for all of the categorized private WiFi networks, executing a second automatic connection process until a successful connection is established to one of the public WiFi networks based upon a second prioritized list.

12. The device of claim 11, wherein the identification data of the device includes at least one of an identity of a user of the device or an identity of the device.

13. The device of claim 11, wherein the independent input is a password.

14. The device of claim 11, further comprising:
generating the first and second prioritized lists as a function of the received probe responses.

15. The device of claim 11, wherein the processor and transceiver are configured to perform a first step of a multistate association by:
transmitting a first probe request on a previously used channel within a band to determine whether one of the WiFi networks using the previously used channel is available for the connection; and
receiving a first probe response from the WiFi network using the previously used channel.

16. The device of claim 15, wherein the processor and transceiver are configured to perform a second step of a multistate association by:
transmitting a second probe request on a plurality of most recently used channels within the band to determine whether further ones of the WiFi networks using the most recently used channels are available for the connection; and
receiving a second probe response from the WiFi networks using the most recently used channels.

17. The device of claim 16, wherein the processor and transceiver are configured to perform a third step of a multistate association by:
transmitting a third probe request on a plurality of remaining channels within the band to determine whether still further ones of the WiFi networks using the remaining channels are available for the connection; and
receiving a third probe response from the WiFi networks using the remaining channels.

18. The device of claim 17, wherein the processor is configured to generate the first and second prioritized lists as a function of the first, second, and third probe responses.

19. The device of claim 11, wherein the public WiFi networks include a legacy HotSpot network, a HotSpot 2.0 network, and a co-located network and wherein the second prioritized list is sorted with the HotSpot 2.0 network having a highest priority, the legacy HotSpot network having an intermediate priority, and the co-located network having a lowest priority.

20. A non-transitory computer readable storage medium with an executable program stored thereon, wherein the program instructs a microprocessor to perform operations comprising:
transmitting a probe request to determine WiFi networks that are available for a connection to the device;
receiving a probe response from a plurality of the WiFi networks;
categorizing, by the processor, each one of the plurality of WiFi networks as one of a private WiFi network or a public WiFi network, the private WiFi network utilizing a first association process in which identification data of a device and an independent input is used to authorize a connection, the public WiFi network utilizing a second association process in which the identification data of the device is used to authorize a connection;

determining that the plurality of WiFi networks includes a private WiFi network that is hidden when the private WiFi network broadcasts a probe response that does not comprise an identification;

scanning, responsive to the determining that the private WiFi network is hidden, for the private WiFi network based at least in part on information from a previous connection between the private WiFi network and the device;

when at least one of the plurality of the WiFi networks is categorized as a private WiFi network, executing a first automatic connection process using the first association process to attempt to connect to the private WiFi network based upon a first prioritized list;

when the attempt to connect to the one of the private WiFi networks is unsuccessful, repeating the executing of the first automatic connection process for ones of the categorized private WiFi networks, based upon the first prioritized list, until a successful connection is established with one of the private WiFi networks or until the first automatic connection process is unsuccessful for all of the categorized private WiFi networks; and when the first automatic connection process is unsuccessful for all of the categorized private WiFi networks, executing a second automatic connection process until a successful connection is established to one of the public WiFi networks based upon a second prioritized list.

* * * * *